United States Patent
Inui et al.

(10) Patent No.: US 7,738,661 B2
(45) Date of Patent: Jun. 15, 2010

(54) BROADCASTING RECEIVING APPARATUS AND BROADCASTING RECEIVING METHOD

(75) Inventors: Yasuhiro Inui, Daito (JP); Takahiro Katayama, Daito (JP); Toshihiro Takagi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 880 days.

(21) Appl. No.: 11/549,312

(22) Filed: Oct. 13, 2006

(65) Prior Publication Data

US 2007/0136747 A1 Jun. 14, 2007

(30) Foreign Application Priority Data

Oct. 14, 2005 (JP) ............... 2005-300252

(51) Int. Cl.
*H04K 1/00* (2006.01)
*H04L 29/06* (2006.01)
(52) U.S. Cl. ...................... 380/270; 713/160
(58) Field of Classification Search .............. 725/37; 713/160; 380/255
See application file for complete search history.

(56) References Cited

U.S. PATENT DOCUMENTS 6,850,252 B1 * 2/2005 Hoffberg ............... 715/716
2002/0092019 A1 * 7/2002 Marcus ................. 725/37
2006/0159117 A1 * 7/2006 Furlong et al. .......... 370/432

FOREIGN PATENT DOCUMENTS

JP 11-220655 A 8/1999
JP 2002-101353 A 4/2002

* cited by examiner

*Primary Examiner*—Kambiz Zand
*Assistant Examiner*—Michael Guirguis
(74) *Attorney, Agent, or Firm*—Crowell & Moring LLP (57) ABSTRACT

Disclosed a digital-broadcasting receiving apparatus including: a scramble judgment member, a decode judgment member, a first registration member to register the sub-channel as a viewable channel when the decode judgment member judges that the broadcast data of the sub-channel can be decoded, a second registration member to register the sub-channel as a viewable channel when the scramble judgment member judges that the broadcast data of the sub-channel is not scrambled, a judgment member, a channel registration control member to register the sub-channel by the first registration member when the judgment member judges that the scramble judgment does not accord with the decode judgment, and registers the sub-channel by the second registration member when the judgment member judges that the judgment obtained by the scramble judgment member accords with the judgment obtained by the decode judgment member.

5 Claims, 4 Drawing Sheets

BROADCASTING RECEIVING APPARATUS AND BROADCASTING RECEIVING METHOD

BACKGROUND OF THE INVENTION

1. Field of the Invention

The present invention relates to a digital-broadcasting receiving apparatus and a digital-broadcasting receiving method.

2. Description of Related Art

A digital-broadcasting wave includes a broadcast data of a physical channel assigned to each frequency band area, and the broadcast data of each physical channel includes a broadcast data of plural sub-channels. In order to allow the broadcast data of the physical channel assigned to the limited frequency band area to include the broadcast data of plural sub-channels, a video data, an audio data, etc., which are included in the broadcast data of the physical channel are coded and multiplexed by the MPEG2 (Moving Picture Experts Group Phase2)-TS (Transport Stream) system. Therefore, in order to view the broadcast data of each sub-channel, in the digital broadcasting receiving apparatus which receives a digital-broadcasting airwave, it is necessary to recognize and register individually beforehand the sub-channel included in the digital-broadcasting wave. Then, the technique to scan and register the broadcast data of the sub-channel included in the digital-broadcasting wave has been developed (e.g. JP2002-101353A).

The sub-channel includes a free sub-channel and a pay sub-channel. A video data, a audio data, etc. of the pay sub-channel are usually coded (hereinafter referred to as "scrambled") so that only the person who paid a charge can view it. In some cases, the non-scrambled broadcast data of the sub-channel and the scrambled broadcast data of the sub-channel are mixed in the broadcast data of the physical channel. In this case, when all the broadcast data of the sub-channels included in the digital-broadcasting wave are scanned and registered, non-scrambled sub-channels which are not viewable are also registered.

The technique to judge, by referring to a tsc (transport scrambling control) bit included in a header region of the broadcast data of the sub-channel which is coded and multiplexed by the MPEG2-TS system included in the broadcast wave, whether the broadcast data of the sub-channel is scrambled or not is known (JPHei11-220655A).

However, actually, because the tsc bit does not often reflect whether the broadcast data is scrambled or not, there is the case that it cannot be exactly judged whether it is scrambled or not by referring the tsc bit. It is possible, by actually decoding the video data and judging whether it can be decoded or not, to judge exactly whether it is scrambled or not. However, because it takes time to decode the scrambled video data, it is not realistic to scan all frequency bands area including the broadcast data of all sub-channels while examining whether they can be decoded or not.

SUMMARY OF THE INVENTION

It is an object of the present invention to provide a digital broadcasting apparatus and a digital broadcasting method in which the sub-channel is examined whether it is scrambled more exactly and is registered more quickly.

In order to accomplish the above object, in accordance with a first aspect of the invention, a digital-broadcasting receiving apparatus comprising: a scanning member to scan a broadcast data of a sub-channel included in a broadcast data of a physical channel which is transmitted by a digital-broadcasting wave; a scramble judgment member to judge whether the broadcast data of the sub-channel is scrambled or not by referring to a predetermined data included in the broadcast data of the sub-channel scanned by the scanning member; a decode judgment member to judge whether the broadcast data of the sub-channel is scrambled or not by judging whether the broadcast data of the sub-channel can be decoded or not; a first registration member to register the sub-channel as a viewable channel when the decode judgment member judges that the broadcast data of the sub-channel can be decoded; a second registration member to register the sub-channel as a viewable channel when the scramble judgment member judges that the broadcast data of the sub-channel is not scrambled; a judgment member to judge whether the judgment obtained by the scramble judgment member accords with the judgment obtained by the decode judgment member; and a channel registration control member to allow the first registration member to register the sub-channel when the judgment member judges that the judgment obtained by the scramble judgment member does not accord with the judgment obtained by the decode judgment member, and to allow the second registration member to register the sub-channel when the judgment member judges that the judgment obtained by the scramble judgment member accords with the judgment obtained by the decode judgment member.

As above, the digital-broadcasting receiving apparatus comprising: a scramble judgment member to judge whether the broadcast data is scrambled or not by referring to the predetermined data included in the broadcast data of the sub-channel scanned by the scanning member, a decode judgment member to judge whether the broadcast data is scrambled or not by judging whether the broadcast data of the sub-channel can be decoded or not, a first registration member to register the sub-channel as a viewable channel when the decode judgment member judges that the broadcast data of the sub-channel can be decoded, a second registration member to register the sub-channel as a viewable channel when the scramble judgment member judges that the broadcast data of the sub-channel is not scrambled, a judgment member to judge whether the judgment obtained by the scramble judgment member accords with the judgment obtained by the decode judgment member. Further, the channel registration control member registers the sub-channel by the first registration member when the judgment member judges the judgment obtained by the scramble judgment member does not accord with the judgment obtained by the decode judgment member, and registers the sub-channel by the second registration member when the judgment member judges the judgment obtained by the scramble judgment member accords with the judgment obtained by the decode judgment member. When it is impossible to judge exactly whether the broadcast data is scrambled or not by referring to the predetermined data included in the broadcast data, the CPU 7 judges whether the broadcast data is scrambled or not by judging whether the broadcast data can be decoded or not, so that only the sub-channel data which is not scrambled is registered more exactly. Further, when it is possible to judge exactly whether the broadcast data is scrambled or not by referring to the predetermined data included in the broadcast data, the CPU 7 refers to the predetermined data so as to judge whether the broadcast data is scrambled or not. The channel is registered more quickly. As a result, it becomes possible to register the sub-channel more quickly as well as to confirm more exactly whether it is scrambled or not.

Preferably, the broadcast data of the physical channel is coded with a MPEG2-TS method, and the predetermined data is one of a transport scrambling control bit in a header region of a video data of the sub-channel, a descriptor tag in the program map table and a packetized elementary stream scrambling control included in the video data or a audio data of the sub-channel.

According to the above, not to mention the effect that is similar to the above, in particular, the predetermined data is one of the transport scrambling control bit in a header region of the video data of the sub-channel, the descriptor tag in the PMT (Program Map Table) and the PES (Packetized Elementary Stream) scrambling control included in the video data or the audio data, and it is possible to select suitable one therefrom. Thus, it is possible to confirm more exactly whether the broadcast data coded with the MPEG2-TS method is scrambled or not.

In accordance with a second aspect of the invention, a digital-broadcasting receiving method for the digital-broadcasting receiving apparatus as claimed in claim 2, comprising the steps of: a scanning step to scan the broadcast data of the sub-channel included in the broadcast data of the physical channel; a scramble judging step to judge whether the broadcast data of the sub-channel is scrambled or not by referring to the predetermined data included in the broadcast data of the sub-channel which is scanned in the scanning step; a decode judging step to judge whether the broadcast data of the sub-channel is scrambled or not by judging whether the broadcast data of the sub-channel can be decoded or not; a judging step to judge whether a judgment obtained in the scramble judging step accords with a judgment obtained in the decode judging step; and a channel registration controlling step to allow the first registration member to register the sub-channel when it is judged in the judging step that the judgment obtained in the scramble judging step does not accord with the judgment obtained in the decode judging step, and to allow the second registration member to register the sub-channel when it is judged in the judging step that the judgment obtained in the scramble judging step accords with the judgment obtained in the decode judging step.

As above, in the scramble judging step, the scramble judgment member judges whether the broadcast data of the sub-channel is scrambled or not by referring to the predetermined data included in the broadcast data of the sub-channel, in the decode judging step, the decode judgment member judges whether the broadcast data is scrambled or not by judging whether the broadcast data of the sub-channel can be decoded or not, in the judging step, the judgment member judges whether the judgment obtained in the scramble judging step accords with the judgment obtained in the decode judging step, in the channel registration controlling step, the channel registration control member registers by the first registration member when it is judged in the judging step that the judgment obtained in the scramble judging step does not accord with the judgment obtained in the decode judging step, and registers by the second registration member when it is judged in the judging step that the judgment obtained in the scramble judging step accords with the judgment obtained in the decode judging step. When it is impossible to judge exactly whether the broadcast data is scrambled or not by referring to the predetermined data included in the broadcast data, the CPU 7 judges whether the broadcast data is scrambled or not by judging whether the broadcast data can be decoded or not, so that only the sub-channel data which is not scrambled is registered more exactly. Further, when it is possible to judge exactly whether the broadcast data is scrambled or not by referring to the predetermined data included in the broadcast data, the CPU 7 refers to the predetermined data so as to judge whether the broadcast data is scrambled or not. The channel is registered more quickly. As a result, it becomes possible to register the sub-channel more quickly as well as to confirm more exactly whether it is scrambled or not.

Preferably, the scramble judging step, the decode judging step, the judging step and the channel registration controlling step are executed for each physical channel.

According to the above, not to mention the effect that is similar to the above, in particular, since the scramble judgment step, the decoding judgment step, the judgment step and the channel registration control step are executed for every physical channel, it is possible to deal with the situation where whether the predetermined data reflects the scrambling differs with respect to the physical channels. Thus, it is possible to register the channel more effectively while confirming whether it is scrambled or not.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE INVENTION

Hereinafter, the best mode for carrying out the digital broadcasting receiving apparatus and a digital-broadcasting receiving method of the present invention will be described in detail with reference to the drawings.

Figure 1:
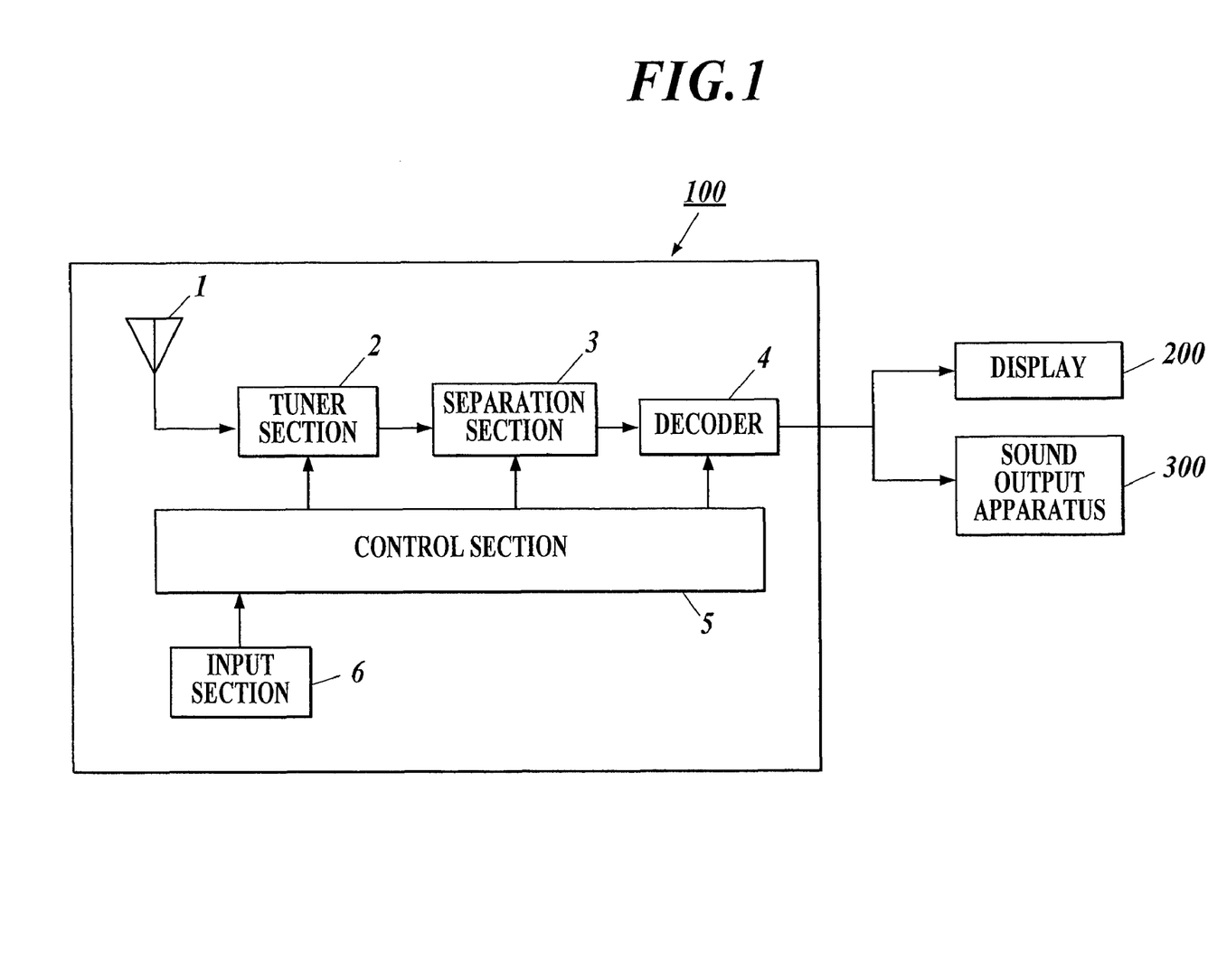
FIG. 1 is a block diagram showing main constitution of the digital broadcasting receiving apparatus of the invention.

First, a composition of a digital-broadcasting receiving apparatus 100 of the invention is explained. The digital-broadcasting receiving apparatus 100 of this invention comprises, as shown in FIG. 1, an antenna 1, a tuner section 2, a separation section 3, a decoder 4, a control section 5, an input section 6, and the like.

The digital-broadcasting receiving apparatus 100 is connected with a display 200 and a sound output apparatus 300.

The antenna 1 is a parabolic antenna, a UHF antenna, etc., receives a digital airwave and outputs a RF (Radio Frequency) signal to a broadcast wave memory or the tuner section 2. A connecting cable (not shown) etc. may be provided instead of the antenna 1 in the case of receiving the digital airwave through a CATV line. A broadcast data of a physical channel contained in the digital airwave is multiplexed by, for example, the MPEG2-TS method.

The tuner section 2 comprises, for example, a mixer (not shown), a tuning circuit (not shown), a reverse interleave circuit (not shown), an error correction circuit (not shown), a demodulation circuit (not shown), etc. In the tuner section 2, the mixer, the tuning circuit, etc. generates the IF (Intermediate Frequency) signal of the physical channel desired by a user from the RF signal inputted from the antenna 1. In the tuner section 2, the reverse interleave circuit, the error correction circuit, the demodulation circuit, etc. give error correction processing, recovery processing, etc. to the generated IF signal, so that the IF signal is converted into a TS (Transport Stream) signal as broadcast data. The TS signal generated by the tuner section 2 is outputted to the separation section 3.

The tuner section 2 is controlled by a CPU 7 executing the scanning program 9C described below, searches entire band of the RF signal inputted from the antenna 1, so as to search a physical channel with an airwave.

The separation section 3 is connected with, for example, the tuner section 2, the decoder 4, etc., divides the TS signal inputted from the tuner section 2 into a video data, a audio data and PSI/SI (Program Specific Information/Service Information), and outputs them to the decoder 4.

The decoder 4 decodes the video data and the audio data inputted from the separation section 3, and outputs them to the display 200 and the sound output apparatus 300.

Figure 2:
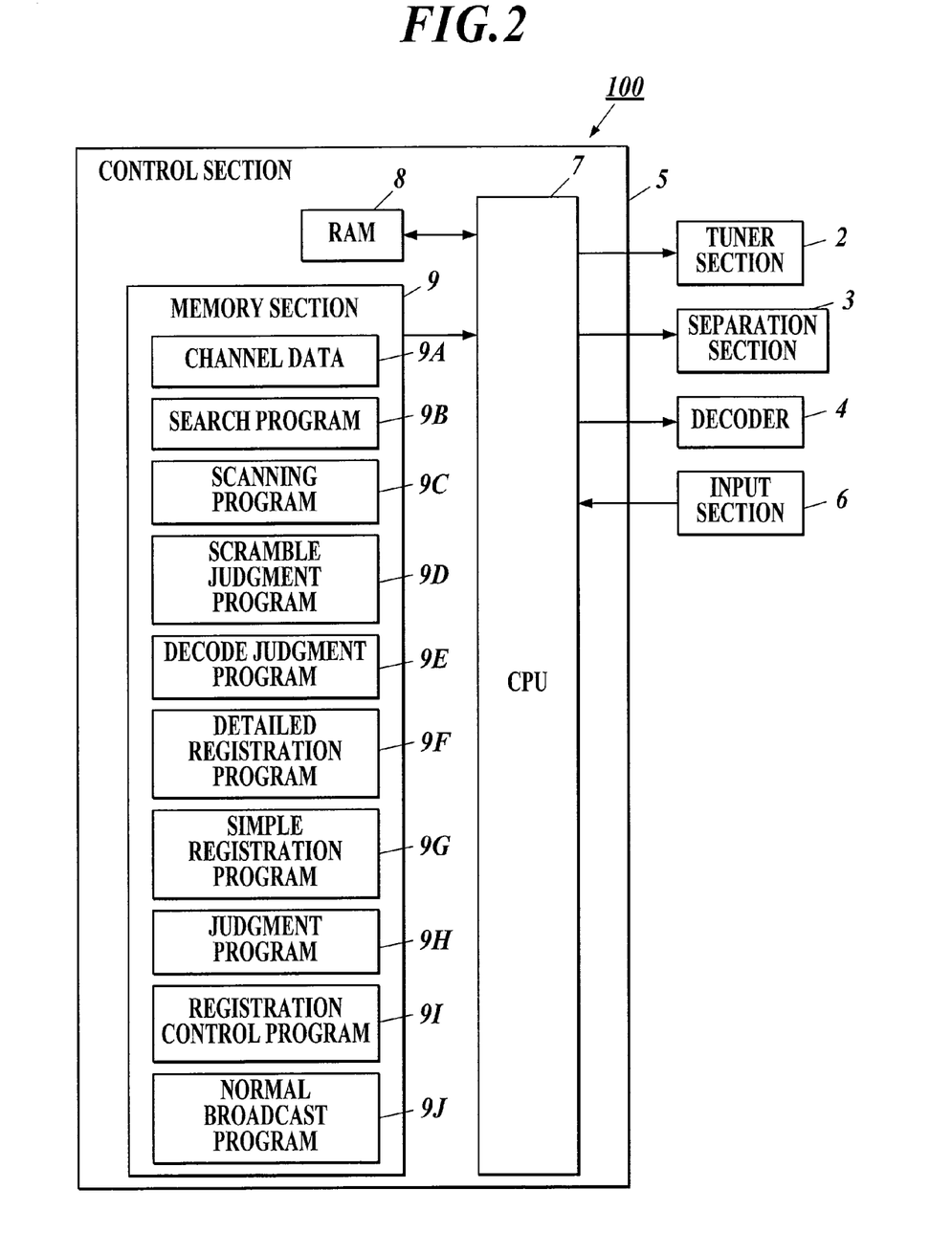
FIG. 2 is a block diagram explaining the relation between a control section and the other sections of the invention.

The control section 5 comprises, as shown in FIG. 2, the CPU (Central Processing Unit) 7, a RAM (Random Access Memory) 8, a memory section 9, etc., is connected with the tuner section 2, the separation section 3, the decoder 4, the input section 6, etc., and controls each section of the digital-broadcasting receiving apparatus 100.

The CPU 7 controls the digital-broadcasting receiving apparatus 100 integrally by retrieving a processing program etc. stored in the memory section 9, developing it to the RAM 8, and executing it.

The RAM 8 develops the processing program etc. executed by the CPU 7 to a program storage region in the RAM 8, and stores an input data and a processing result produced in executing the above-mentioned processing program to a data storage region.

The memory section 9 comprises, for example, a recording medium (not shown) to which a program or a data are stored previously, and the recording medium comprises a semiconductor memory, etc. The memory section 9 stores various data for the CPU 7 to control the digital-broadcasting receiving apparatus 100 integrally, various processing programs, a data processed by executing these programs, etc. Specifically, the memory section 9 stores, for example as shown in FIG. 2, a channel data 9A, a search program 9B, a scanning program 9C, a scramble judgment program 9D, a decode judgment program 9E, a detailed registration program 9F, a simple registration program 9G, a judgment program 9H, a registration control program 9I, a normal broadcast program 9J, etc.

The channel data 9A stores, for example, a sub-channel which is not scrambled, as a viewable channel.

The search program 9B, for example, is a program for the CPU 7 to control the tuner section 2 to search entire band of the RF signal inputted from the antenna 1, to convert the RF signal into the IF signal of the physical channel, to convert the IF signal into the TS signal of a predetermined physical channel.

The scanning program 9C, for example, is a program for the CPU 7 to scan a broadcast data of a sub-channel included in the TS signal generated by the tuner section 2. The CPU 7 is the member to scan by executing the scanning program 9C.

The scramble judgment program 9D, for example, is a program for the CPU 7 to refer to a predetermined data included in the broadcast data of the scanned sub-channel, and to judge whether the broadcast data is scrambled or not. Specifically, the scramble judgment program 9D, for example, is a program for the CPU 7 to refer to one of the transport scrambling control bit in a header region of the video data included in the broadcast data of the sub-channel, the descriptor tag in the PMT (Program Map Table) and the PES (Packetized Elementary Stream) scrambling control included in the video data or the audio data, so as to judge whether the broadcast data is scrambled or not. The CPU 7 functions as the scramble judgment member by executing the scramble judgment program 9D.

Specifically, the CPU 7 refers to a tsc bit which is the 2-bit field according to section 2.4.3.3 of ISO/IEC 13818-1 "Semantic definition of fields in Transport Stream packet layer" so as to judge that the broadcast data is scrambled when the values of the tsc bit is "01", "10", or "11", and to judge that the broadcast data is not scrambled when the value of the tsc bit is "00".

When there is a descriptor according to the syntax of section 2.6.1 of ISO/IEC 13818-1 "Semantic definition of fields in program and program element descriptors" in the PMT according to the syntax of section 2.4.4.9 of ISO/IEC 13818-1 "Semantic definition of fields in Transport Stream program map section" and a the descriptor tag which is a value within the syntax is "0x09", i.e., a value showing CA (Conditional Access) descriptor, the CPU 7 judges that the broadcast data is scrambled and when the descriptor tag is not "0x09", CPU 7 judges that the broadcast data is not scrambled.

The CPU 7 refers to the PES scrambling control which is the 2-bit field according to section 2.4.3.7 of ISO/IEC 13818-1 "Semantic definition of fields in PES packet" so as to judge that the broadcast data is scrambled when the value of the PES scrambling control is "01", "10" or "11", and to judge that the broadcast data is not scrambled when the value of the PES scrambling control is "00".

The decode judgment program 9E, for example, is a program for the CPU 7 to control the decoder 4 and let it decode the broadcast data of the scanned sub-channel, and to judge whether the broadcast data is scrambled or not by judging whether it can be decoded or not. The CPU 7 functions as a decode judgment member to judge whether the broadcast data can be decoded or not when the decode judgment program 9E is executed.

The detailed registration program 9F, for example, is a program for the CPU 7 to store the sub-channel at the channel data 9A as a viewable channel when the CPU 7 executes the decode judgment program 9E and judges that the broadcast data can be decoded. The CPU 7 functions as a first registration member when the detailed registration program 9F is executed.

The simple registration program 9G, for example, is a program for the CPU 7 to store the sub-channel at the channel data 9A as a viewable channel when it executes the scramble judgment program 9D and judges that the broadcast data is not scrambled. The CPU 7 functions as a second registration member when the simple registration program 9G is executed.

The judgment program 9H is, for example, a program for the CPU 7 to judge whether the judgment obtained by executing the scramble judgment program 9D accords with the judgment obtained by executing the decode judgment program 9E. The CPU 7 functions as a judgment member when the judgment program 9H is executed.

The registration control program 9I, for example, is a program for the CPU 7 to execute the detailed registration program 9F and register the sub-channel when the CPU 7 executes the judgment program 9H and judges that the judgment obtained by executing the scramble judgment program 9D does not accord with the judgment obtained by executing the decode judgment program 9E (a detailed mode), and to executes the simple registration program 9G and register the sub-channel when the CPU 7 judges that the judgment obtained by executing the scramble judgment program 9D accords with the judgment obtained by executing the decode judgment program 9E (a simple mode). The CPU 7 functions as a channel registration control member to execute this registration control program 9I and controls the registration.

The normal broadcast program 9J, for example, is a program for the CPU 7 to control the tuner section 2 to generate the IF signal of the physical channel desired by a user from the RF signal inputted from the antenna 1 and convert the IF signal into the TS signal; to control the separation section 3 to divide the TS signal inputted from the tuner section 2 into the video data, the audio data and the PSI/SI (Program Specific Information/Service Information); and to control the decoder 4 to decode the video data and the audio data inputted from the separation section 3 so as to generate a video signal and a sound signal and output the video signal and the sound signal to the display 200 and the sound output apparatus 300 respectively.

The input section 6 comprises a key etc. to input an input signal of various operations into the digital-broadcasting receiving apparatus 100, and when a user operates the input section 6, an input signal of the various operations is inputted into the digital-broadcasting receiving apparatus 100.

Figure 3:
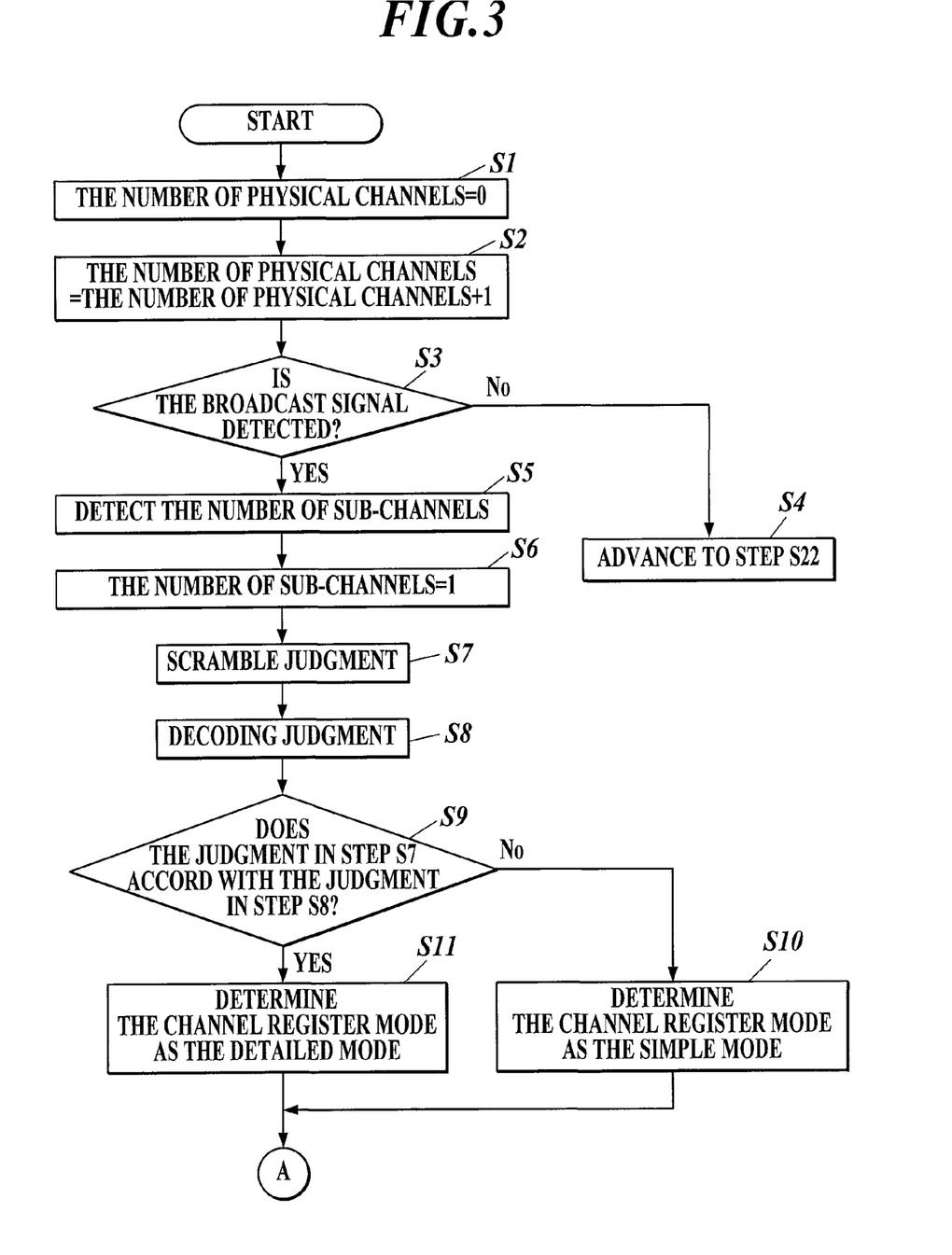
FIG. 3 is a flow chart explaining operation of the digital broadcasting receiving apparatus of the invention.
Figure 4:
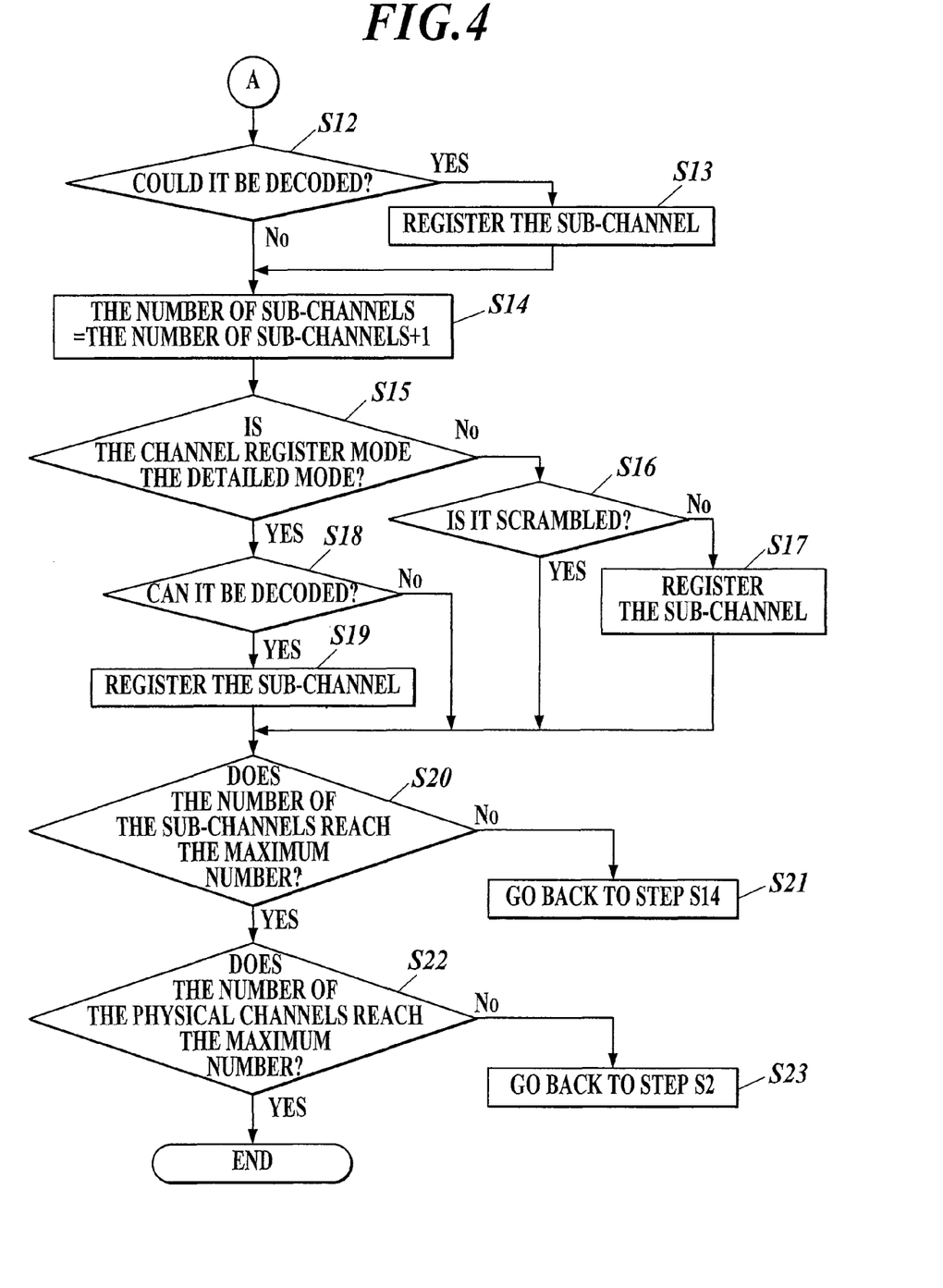
FIG. 4 is a flow chart explaining operation of the digital broadcasting receiving apparatus of the invention.

Next, a channel registration operation of the digital-broadcasting receiving apparatus 100 of the present invention which has the above-mentioned composition is explained, referring to flow charts shown in FIG. 3 and FIG. 4.

First, a user operates the input section 6 to input a channel registration operation signal. The CPU 7 initializes the number of physical channels (the number of physical channels=0) which has been searched by the CPU 7 and stored at the RAM 8 (Step S1).

Subsequently, the CPU 7 adds "1" to the number of physical channels (Step S2).

Next, the CPU 7 controls the tuner section 2 by executing the search program 9B, so as to search entire band of the RF signal inputted from the antenna 1, and let it detect the RF signal of the physical channel with a broadcast signal (Step S3).

In Step S3, when the tuner section 2 does not detected the RF signal of the physical channel with the broadcast signal (Step S3; No), the channel registration operation advances to Step S22 (Step S4).

In Step S3, when the tuner section 2 detects the RF signal of the physical channel with the broadcast signal (Step S3; Yes), the CPU 7 controls the tuner section 2 based on the search program 9B, to detect the number of sub-channels contained in the physical channels detected in Step S3 (Step S5).

Subsequently, the CPU 7 initializes the number of sub-channels (the number of sub-channels=1) which is registered by the CPU 7 and stored at the RAM 8 (Step S6).

Next, the CPU 7, based on the search program 9B, converts the RF signal into the IF signal, converts the IF signal into the TS signal, scans the broadcast data of the sub-channel of "1" contained in the TS signal by executing the scanning program 9C (scanning step). The CPU 7 executes the scramble judgment program 9D and judges whether the broadcast data is scrambled or not (Step S7: scramble judgment step).

Next, the CPU 7 executes the decode judgment program 9E and judges whether the broadcast data is scrambled or not by judging whether it can be decoded or not (Step S8: decoding judgment step).

Next, the CPU 7 executes the judgment program 9H so as to judge whether the judgment in Step S7 accords with the judgment in Step S8 (Step S9: judgment step).

In Step S9, when the CPU 7 judges that the judgment in Step S7 does not accord with the judgment in Step S8 (Step S9; No), the CPU 7 executes the registration control program 9I so as to determine the channel register mode as the detailed mode (Step S10).

In Step S9, when the CPU 7 judges that the judgment in Step S7 accords with the judgment in Step S8 (Step S9; Yes), the CPU 7 executes the registration control program 9I so as to determine the channel register mode as the simple mode (Step S11). Steps S9 to S11 constitute a channel registration control step.

Subsequently, the CPU 7 refers to the processing result of Step S8 stored at the RAM 8 so as to judge whether the broadcast data of the sub-channel of "1" can be decoded or not (Step S12).

In Step S12, when the CPU 7 judges that the broadcast data of the sub-channel of "1" cannot be decoded (Step S12; No), the channel registration operation advances to Step S14.

In Step S12, when the CPU 7 judges that the broadcast data of the sub-channel of "1" can be decoded (Step S12; Yes), the CPU 7 stores the sub-channel as a viewable channel at the channel data 9A (Step S13).

Next, the CPU 7 adds "1" to the number of sub-channels which is registered by the CPU 7 and stored at the RAM 8 (Step S14).

Next, the CPU 7 refers to the processing result stored at the RAM 8 so as to judge whether the CPU 7 determined the channel register mode as the detailed mode or not (Step S15).

In Step S15, when the CPU 7 judges that the CPU 7 determined the channel register mode as the simple mode (Step S15; No), the CPU 7 executes the simple registration program 9G and executes the scramble judgment program 9D so as to judge whether the broadcast data of the sub-channel included in the TS signal is scrambled or not (Step S16).

In Step S16, when the CPU 7 judges that the broadcast data is scrambled (Step S16; Yes), the channel registration operation advances to Step S20.

In Step S16, when the CPU 7 judges that the broadcast data is not scrambled (Step S16; No), the CPU 7, based on the simple registration program 9G, registers the sub-channel by storing it as a viewable channel at the channel data 9A (Step S17), and the channel registration operation advances to Step S20.

On the other hand, in Step S15, when the CPU 7 judges that the CPU 7 determined the channel register mode as the detailed mode (Step S15; Yes), the CPU 7 executes the detailed registration program 9F and executes the decode judgment program 9E so as to judge whether the broadcast data can be decoded or not (Step S18).

In Step S18, when the CPU 7 judges that the broadcast data cannot be decoded (Step S18; No), the channel registration operation advances to Step S20.

In Step S18, when the CPU 7 judges that the broadcast data can be decoded (Step S18; Yes), the CPU 7, based on execution of the detailed registration program 9F, stores the sub-channel as a viewable channel at the channel data 9A (Step S19).

Next, the CPU 7 refers to the processing results etc. stored at the RAM 8 so as to judge whether the number of the registered sub-channels reaches the maximum number of the channels or not (Step S20).

In Step S20, when the CPU 7 judges that the number of the sub-channels does not reach the maximum number of the channels (Step S20; No), the channel registration operation comes back to Step S14 (Step S21).

In Step S20, when the CPU 7 judges that the number of the sub-channels reaches the maximum number of the channels (Step S20; Yes), the CPU 7 refers to the processing results etc. stored at the RAM 8 so as to judge whether the number of the physical channels searched by the CPU 7 reaches the maximum number of the physical channels or not (Step S22).

In Step S22, when the CPU 7 judges that the number of the physical channels searched by the CPU 7 does not reach the maximum number of the physical channels (Step S22; No), the channel registration operation comes back to Step S2 (Step S23).

In Step S22, when the CPU 7 judges that the number of the searched physical channels reaches the maximum number of the physical channels (Step S22; Yes), the channel registration operation ends.

According to the above-described digital broadcasting receiving apparatus 100 and the digital-broadcasting receiving method of the present invention, the CPU 7 executes the registration control program 9I and registers the sub-channel with the detailed mode when the judgment of the scramble judgment program 9D does not accord with the judgment of the decode judgment program 9E in the execution of the judgment program 9H, and registers the sub-channel with the simple mode when the judgment of the scramble judgment program 9D accords with the judgment of the decode judgment program 9E. When it is impossible to judge exactly whether the broadcast data is scrambled or not by referring to the predetermined data included in the broadcast data, the CPU 7 judges whether the broadcast data is scrambled or not by judging whether the broadcast data can be decoded or not, so that only the sub-channel data which is not scrambled is registered more exactly. Further, when it is possible to judge exactly whether the broadcast data is scrambled or not by referring to the predetermined data included in the broadcast data, the CPU 7 refers to the predetermined data so as to judge whether the broadcast data is scrambled or not. The channel is registered more quickly. As a result, it becomes possible to register the sub-channel more quickly as well as to confirm more exactly whether it is scrambled or not.

The predetermined data is one of the transport scrambling control bit in a header region of the video data of the sub-channel, the descriptor tag in the PMT (Program Map Table) and the PES (Packetized Elementary Stream) scrambling control included in the video data or the audio data, and it is possible to select suitable one therefrom. Thus, it is possible to confirm more exactly whether the broadcast data decoded with the MPEG2-TS method is scrambled or not.

Since the scramble judgment step, the decoding judgment step, the judgment step and the channel registration control step are executed for every physical channel, it is possible to deal with the situation where whether the predetermined data reflects the scrambling differs with respect to the physical channels. Thus, it is possible to register the channel more effectively while confirming whether it is scrambled or not.

The predetermined data to which the CPU 7 refers by executing the scramble judgment program 9D may be selected by a user or previously set in the digital broadcasting receiving apparatus 100, from the transport scrambling control bit, CA-descriptor, the PES scrambling control.

The predetermined data to which the CPU 7 refers by executing the scramble judgment program 9D is not limited to the present embodiment, any data can be given as long as the data can be judged whether it is scrambled or not.

Multiplexing of the broadcast data of the physical channel may be methods other than the MPEG2-TS method. When the broadcast data is multiplexed by methods other than the MPEG2-TS method, the predetermined data to which the CPU 7 refers by executing the scramble judgment program 9D may be any data as long as the data can be judged that it is scrambled or not.

The entire disclosure of Japanese Patent Application No. 2005-300252 filed on Oct. 14, 2005, including description, claims, drawings and summary are incorporated herein by reference in its entirety.

What is claimed is:

1. A digital-broadcasting receiving apparatus comprising:
 a scanning member to scan broadcast data of each of a plurality of sub-channels included in each of a plurality of physical channels transmitted by a digital-broadcasting wave, the broadcast data being coded with an MPEG2-TS method
 a decode judgment member to judge whether broadcast data of a sub-channel is scrambled data or not by judging whether the broadcast data can be decoded or not;
 a first registration member to register the sub-channel as a viewable channel when a first judgment result obtained by the decode judgment member is that the broadcast data of the sub-channel is not scrambled data;
 a scramble judgment member to judge whether the broadcast data of the sub-channel is scrambled data or not by referring to one of a transport scrambling control bit in a header region of video data of the sub-channel, a descriptor tag in the program map table included in the video data or audio data of the sub-channel, and a packetized elementary stream scrambling control included in the video data or the audio data of the sub-channel;
 a second registration member to register the sub-channel as a viewable channel when a second judgment result obtained by the scramble judgment member is that the broadcast data of the sub-channel is not scrambled data;
 a judgment member to judge whether the first judgment result accords with the second judgment result or not for the sub-channel; and
 a channel registration control member to allow the first registration member to register the sub-channel when the judgment member judges that the first judgment result does not accord with the second judgment result, and to allow the second registration member to register the sub-channel when the judgment member judges that the first judgment result accords with the second judgment result.

2. A digital-broadcasting receiving apparatus comprising:
 a scanning member to scan broadcast data of each of a plurality of sub-channels included in each of a plurality of physical channels transmitted by a digital-broadcasting wave;
 a decode judgment member to judge whether broadcast data of a sub-channel is scrambled data or not by judging whether the broadcast data can be decoded or not;
 a first registration member to register the sub-channel as a viewable channel when a first judgment result obtained by the decode judgment member is that the broadcast data of the sub-channel is not scrambled data;
 a scramble judgment member to judge whether the broadcast data of the sub-channel is scrambled data or not by referring to predetermined data included in the broadcast data of the sub-channel scanned by the scanning member;
 a second registration member to register the sub-channel as a viewable channel when a second judgment result obtained by the scramble judgment member is that the broadcast data of the sub-channel is not scrambled data;
 a judgment member to judge whether the first judgment result accords with the second judgment result or not for the sub-channel; and
 a channel registration control member to allow the first registration member to register the sub-channel when the judgment member judges that the first judgment result does not accord with the second judgment result and to allow the second registration member to register the sub-channel when the judgment member judges that the first judgment result accords with the second judgment result.

3. The digital-broadcasting receiving apparatus as claimed in claim 2, wherein the broadcast data of the physical channel is coded with an MPEs2-TS method, and the predetermined data is one of a transport scrambling control bit in a header region of a video data of the sub-channel, a descriptor tag in the program map table and a packetized elementary stream scrambling control included in the video data or audio data of the sub-channel.

4. A digital-broadcasting receiving method for the digital-broadcasting receiving apparatus as claimed in claim 2, comprising the steps of:
   a scanning step to scan the broadcast data of the sub-channel included in the physical channel;
   a scramble judging step to judge whether the broadcast data of the sub-channel is scrambled data or not by referring to the predetermined data included in the broadcast data of the sub-channel which is scanned in the scanning step;
   a decode judging step to judge whether the broadcast data of the sub-channel is scrambled data or not by judging whether the broadcast data of the sub-channel can be decoded or not;
   a judging step to judge whether the second judgment result obtained in the scramble judging step accords with the first judgment result obtained in the decode judging step; and
   a channel registration controlling step to allow the first registration member to register the sub-channel when it is judged in the judging step that the second judgment result does not accord with the first judgment result and to allow the second registration member to register the sub-channel when it is judged in the judging step that the second judgment result accords with the first judgment result.

5. The digital-broadcasting receiving method as claimed in claim 4,
   wherein the scramble judging step, the decode judging step, the judging step and the channel registration controlling step are executed for each physical channel.

* * * * *